(12) United States Patent
Bouchard et al.

(10) Patent No.: US 6,990,798 B2
(45) Date of Patent: Jan. 31, 2006

(54) HYBRID INLET

(75) Inventors: Guy Bouchard, Mont St-Hilaire (CA); Zenon Szlanta, Brossard (CA); Lazar Mitrovic, Longueuil (CA)

(73) Assignee: Pratt & Whitney Corp., Longueuil (CA)

( * ) Notice: Subject to any disclaimer, the term of this patent is extended or adjusted under 35 U.S.C. 154(b) by 0 days.

(21) Appl. No.: 10/823,695

(22) Filed: Apr. 14, 2004

(65) Prior Publication Data

US 2005/0229605 A1    Oct. 20, 2005

(51) Int. Cl.
F02C 7/04    (2006.01)

(52) U.S. Cl. .............. 60/269; 137/15.1; 244/53 B

(58) Field of Classification Search .............. 60/269, 60/904; 137/15.1; 244/53 B
See application file for complete search history.

(56) References Cited

U.S. PATENT DOCUMENTS

| | | | |
|---|---|---|---|
| 2,788,184 A * | 4/1957 | Michael | 244/53 B |
| 4,240,250 A | 12/1980 | Harris | |
| 4,617,028 A * | 10/1986 | Ray et al. | 95/267 |
| 4,881,367 A * | 11/1989 | Flatman | 60/785 |
| 4,930,725 A * | 6/1990 | Thompson et al. | 244/53 R |
| 5,284,012 A * | 2/1994 | Laborie et al. | 60/39.08 |
| 5,345,760 A * | 9/1994 | Giffin, III | 60/226.1 |
| 5,483,791 A * | 1/1996 | Kotwal et al. | 60/796 |
| 5,725,180 A * | 3/1998 | Chamay et al. | 244/53 B |

FOREIGN PATENT DOCUMENTS

| | | |
|---|---|---|
| EP | 0 000754 | 12/1980 |
| EP | 0 385 294 | 4/1992 |

* cited by examiner

*Primary Examiner*—Ehud Gartenberg
(74) *Attorney, Agent, or Firm*—Ogilvy Renault LLP

(57) ABSTRACT

A turboprop powerplant with at least a compressor having a forward compressor inlet and a shaft extending axially through the compressor and having a shaft axis, an inlet duct encircling the shaft passing therethrough, the inlet duct having an aft end in gas communication with the compressor inlet and a forward end having at least two branches each with an inlet orifice, each inlet orifice having a centroid in a radial plane through and transverse to the shaft axis, the centroids and shaft axis defining an angle less than 180°.

12 Claims, 8 Drawing Sheets

HYBRID INLET

TECHNICAL FIELD

The invention relates to a hybrid inlet duct for a gas turbine engine, such as a turboprop, having at least two forwardly open inlet orifices spaced apart less than 180 degrees within a half of the engine, to accommodate a forwardly projecting shaft or gearbox while clearing top and lateral forward engine mounting surfaces.

BACKGROUND OF THE ART

Various configurations of gas turbine engines include a forwardly projecting engine shaft about which an air inlet duct is positioned. For example, a turboprop engine and installation may have an upwardly offset reduction gear boxes that drives the propeller and downwardly offset air intake ducts. Further a turboprop may have a coaxial reduction gear box with a bifurcated air inlet duct with an upper and a lower air inlet duct and intake orifice. Especially in the case of aircraft engines, the size and weight of the inlet duct and the effect that the duct geometry has on the size and weight of the engine shaft must be minimized.

The conflict between the air inlet duct and a forwardly projecting shaft has conventionally been resolved by adopting either a single bottom inlet or a bifurcated inlet having two inlets top and bottom. In contrast, when the gas turbine engine is configured as a turbofan, the air inlet and fan casing draw in air in a generally axial direction. In the case of a single inlet, the air inlet duct is diverted downwardly and thereby allows the use of an upwardly offset reduction gearbox. In order to provide a relatively large curvature and minimize aerodynamic losses in airflow in advance of the compressor stage, the single inlet design generally makes the engine longer with associated penalties in shaft length, engine weight and larger outer surface area. A benefit is that a single bottom inlet frees the top of the reduction gearbox for use as an engine mounting surface.

A second conventional design choice is to bifurcate the inlet duct to have two separate branch inlets usually top and bottom. A bifurcated duct results in a shorter engine but which restricts the engine mounting surface locations. Where a bifurcated top is located on the top of the engine, the mounting location possible on the top of the engine must be shifted aftwards to clear the duct. As a result, the engine casing structure must be reinforced to accommodate the overhanging weight and therefore weight and size penalties also apply to the engine when a bifurcated inlet duct is used.

Features of the invention will be apparent from review of the disclosure, drawings and description of the invention below.

DISCLOSURE OF THE INVENTION

The invention provides a turboprop powerplant with at least a compressor having a forward compressor inlet and a shaft extending axially through the compressor and having a shaft axis, an inlet duct encircling the shaft passing therethrough, the inlet duct having an aft end in gas communication with the compressor inlet and a forward end having at least two branches each with an inlet orifice, each inlet orifice having a centroid in a radial plane through and transverse to the shaft axis, the centroids and shaft axis defining an angle less than 180°.

The invention provides a hybrid inlet duct which allows top mounting of the engine preferably without increasing the engine length and weight, or increasing aerodynamic losses significantly.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
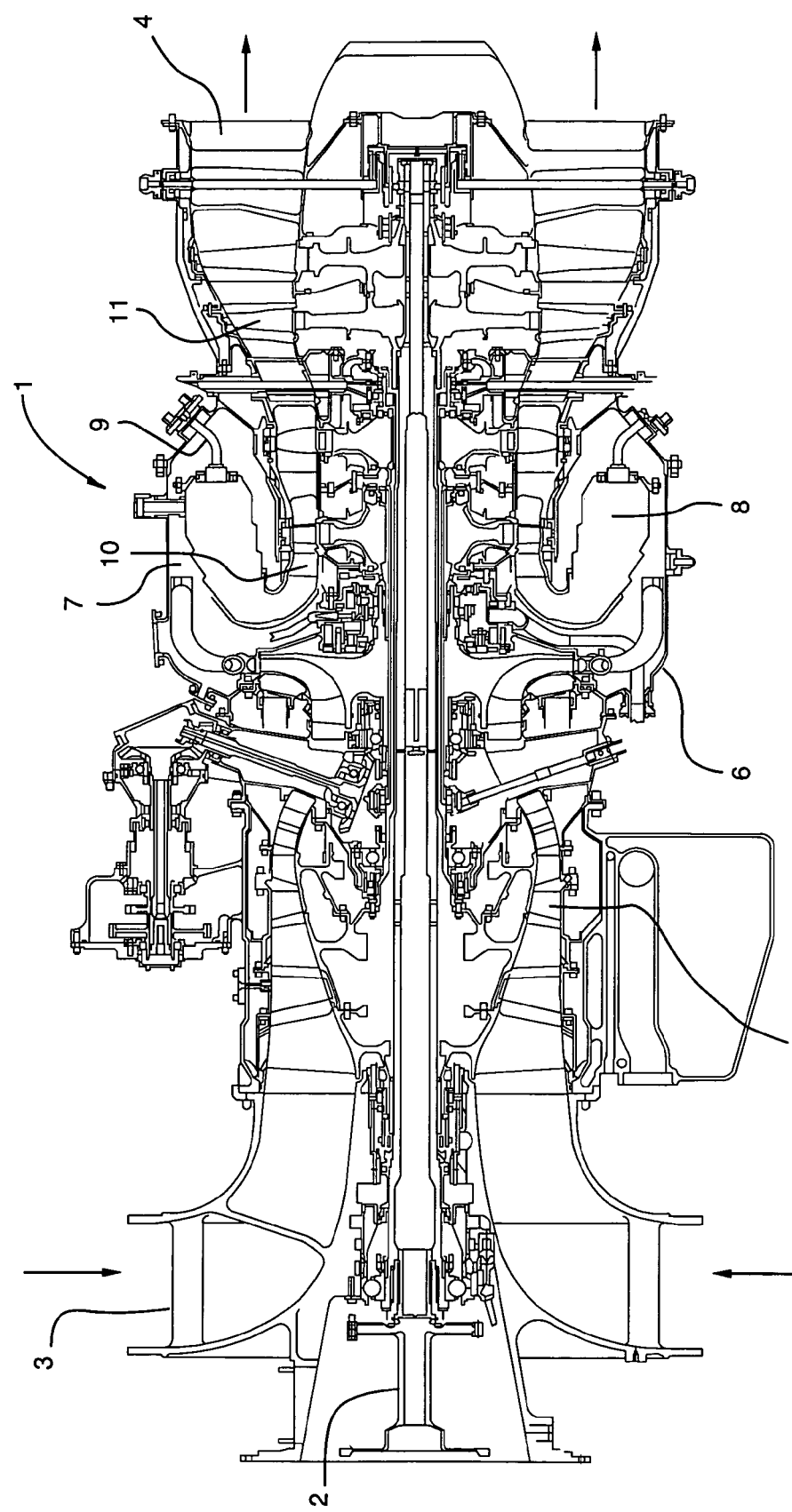
FIG. 1 shows an axial cross-sectional view through a prior art turboshaft gas turbine engine to illustrate the main components common to gas turbine engines and to indicate various optional configurations of the air inlet duct.

FIG. 1 shows an axial cross-section through a conventional turboshaft gas turbine engine 1 adapted for rotary wing aircraft to show the main components common to gas turbine engines and display optional configurations for the inlet duct. It will be understood however that the invention is also applicable to any type of gas turbine engine with an inlet duct and a forwardly projecting shaft or gearbox such as a turboprop for fixed wing aircraft, an auxiliary power unit, or stationary electric generator engine. Gas turbine engines are also adapted for non-aircraft applications such as locomotives, ships, military vehicles, fossil fuel pumping and electrical power generation. Depending on the particular arrangement of the engine shaft, engine mounting locations and air inlet duct configuration, the invention may be applied to any such gas turbine engine.

Air intake into the engine 1 is diverted around the forwardly extending engine shaft 2 through the inlet duct 3 and is expelled through the exhaust outlet 4. In the turboshaft engine 1 of FIG. 1, the inlet duct draws in air radially through a 360° circumferentially open orifice that is usually fitted with a screen (not shown). The air then passes through the low-pressure axial compressor 5 and high-pressure centrifugal compressor. Compressed air exits the compressor section through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the combustor walls or is used for cooling to eventually mix with the hot gases from the combustor 8 and pass over the nozzle guide vane 10 to drive the turbines 11 before exiting the tail of the engine as exhaust.

It will be understood that the portions of the engine 1 shown in FIG. 1 that are downstream or aft of the air inlet duct 3 and forward reduction gear box are generally common to all gas turbine engines. Therefore, the remaining FIGS. 2 through 8 focus on the forward portion of the engine showing the various configurations of the air inlet duct, forward engine mounting surfaces and reduction gear box.

Figure 2:
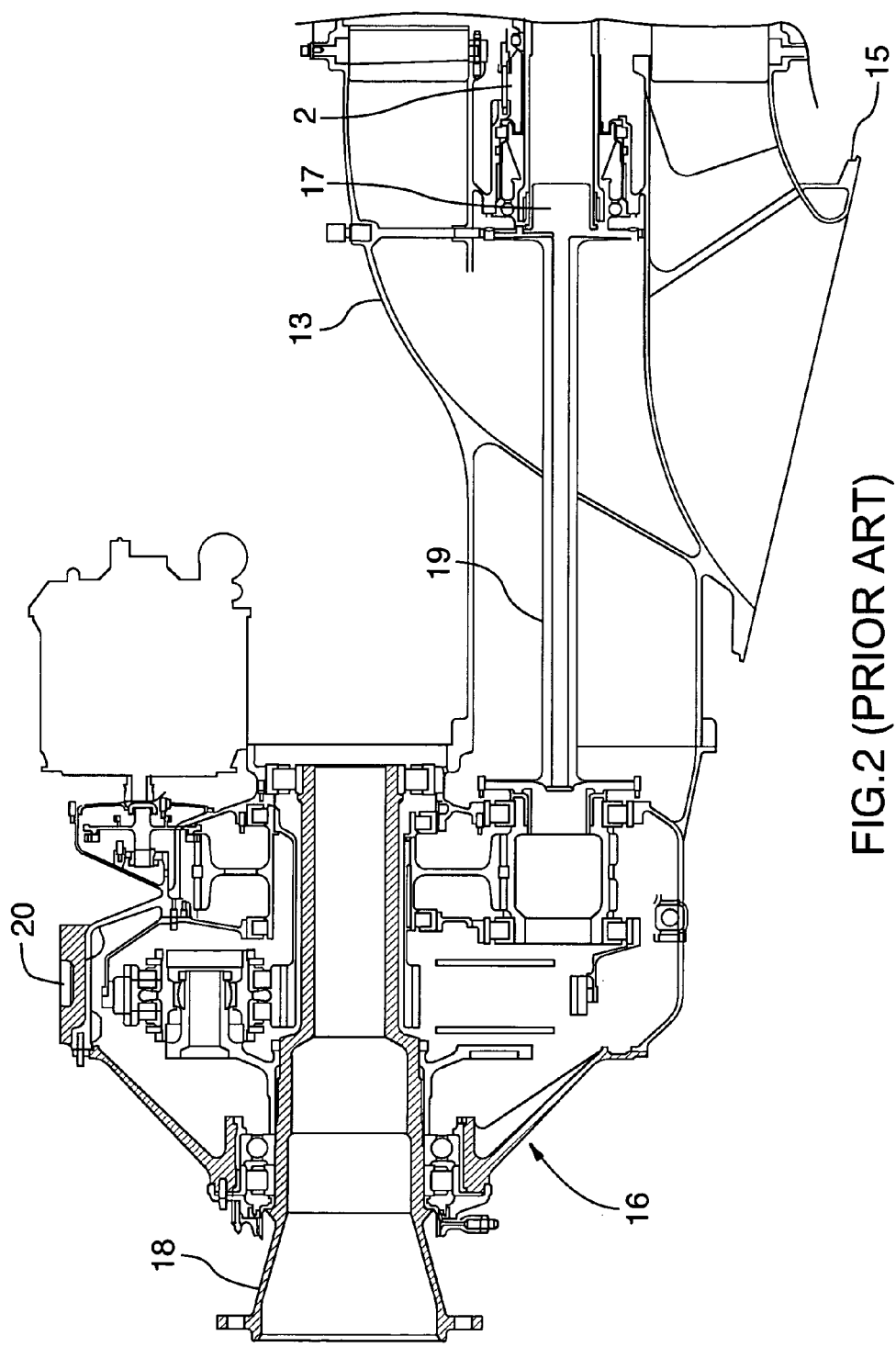
FIG. 2 is an axial cross section through a turboprop engine having an upwardly offset reduction gear box and associated downwardly offset single air inlet.
Figure 3:
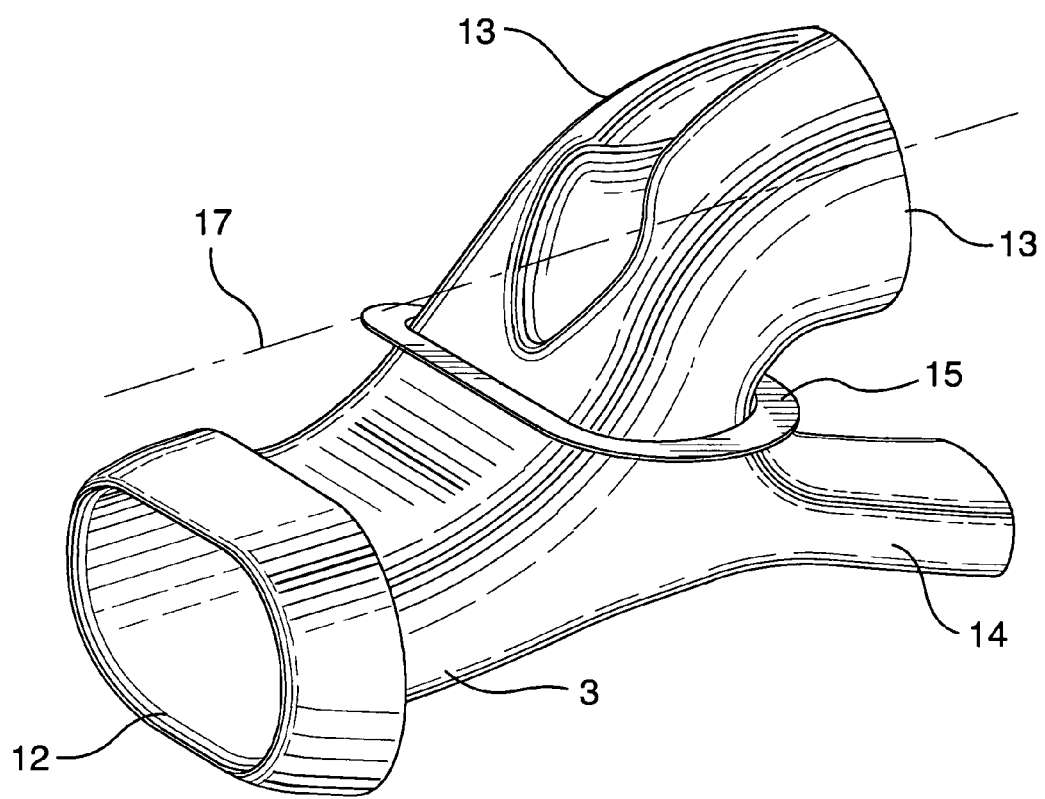
FIG. 3 is a three-dimensional rendering of a conventional downwardly offset single inlet air duct as in FIG. 2.

FIGS. 2 and 3 show a first prior at configuration with a single inlet orifice which draws in air through dual feeder ducts 13 that terminate in an annular outlet in communication with the inlet to the compressor 5. A portion of the air drawn through the single inlet orifice 12 is expelled through the bypass duct 14. As inlet air is forced to curve upwardly toward the dual feeder ducts 13, relatively heavy foreign particles are separated under centrifugal force and expelled through the bypass duct 14 thereby preventing foreign particles and objects from entering into the compressor 5.

As a feature of reference, the connecting flange 15 is shown both in FIG. 3 and FIG. 2. Referring to FIG. 2, the engine shaft 2 projects forwardly into the upwardly offset reduction gearbox 16. The shaft 2 has a central shaft axis 17. It will be appreciated therefore that when a single inlet orifices 12 is used, the inlet duct 3 is offset downwardly, whereas the engine shaft 2 projects forwardly and is offset upwardly by the offset reduction gearbox reduction 16, to drive a propeller for example attached to output shaft 18. A disadvantage of this prior art arrangement is that the shaft 17 must be significantly extended with forward shaft portion 19 which enables the dual feeder ducts 13 to be configured with a relatively large curvature and thereby aerodynamic losses are reduced. The longer the forward shaft portion 19 is, the larger the radius of curvature of the dual feeder ducts 13 can become. However there is a trade off penalty in the resultant increased length of the engine and overall weight.

Figure 9:
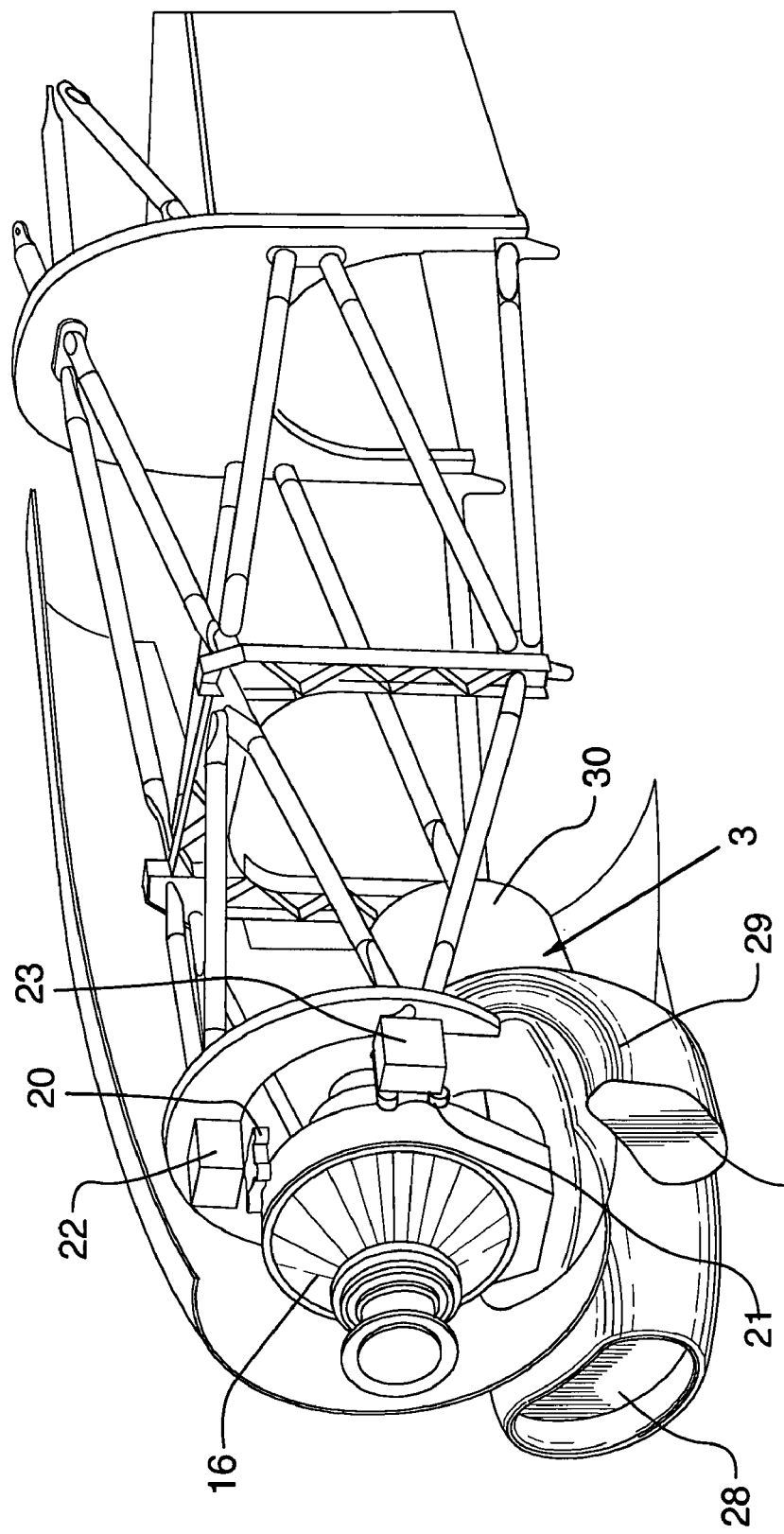
FIG. 9 is a partially broken way view of the engine housing showing the forward support structure and the dual inlet orifices according to the invention.

An advantage of this prior art arrangement however is that the reduction gearbox 16 is a relatively heavy and robust structure which can be used for supporting the engine on the air frame structure. As shown in FIG. 2 therefore the offset reduction gearbox 16 includes a forward top engine mountain surface 20. Lateral sides of the gearbox 16 can also include lateral engine mounting surfaces 20, 21 which are not shown in FIG. 2 but are as shown in FIG. 9 adjacent the top block 22 and lateral block 23 which serve to mount the engine on a yolk of the airframe.

Therefore, to summarize to arrange the single inlet 12 arrangement shown in FIGS. 2 and 3 has the advantage of favorable forward mounting arrangements at the top and lateral points but imposes the disadvantages of extended engine length, increased weight, size and cost penalties.

Figure 4:
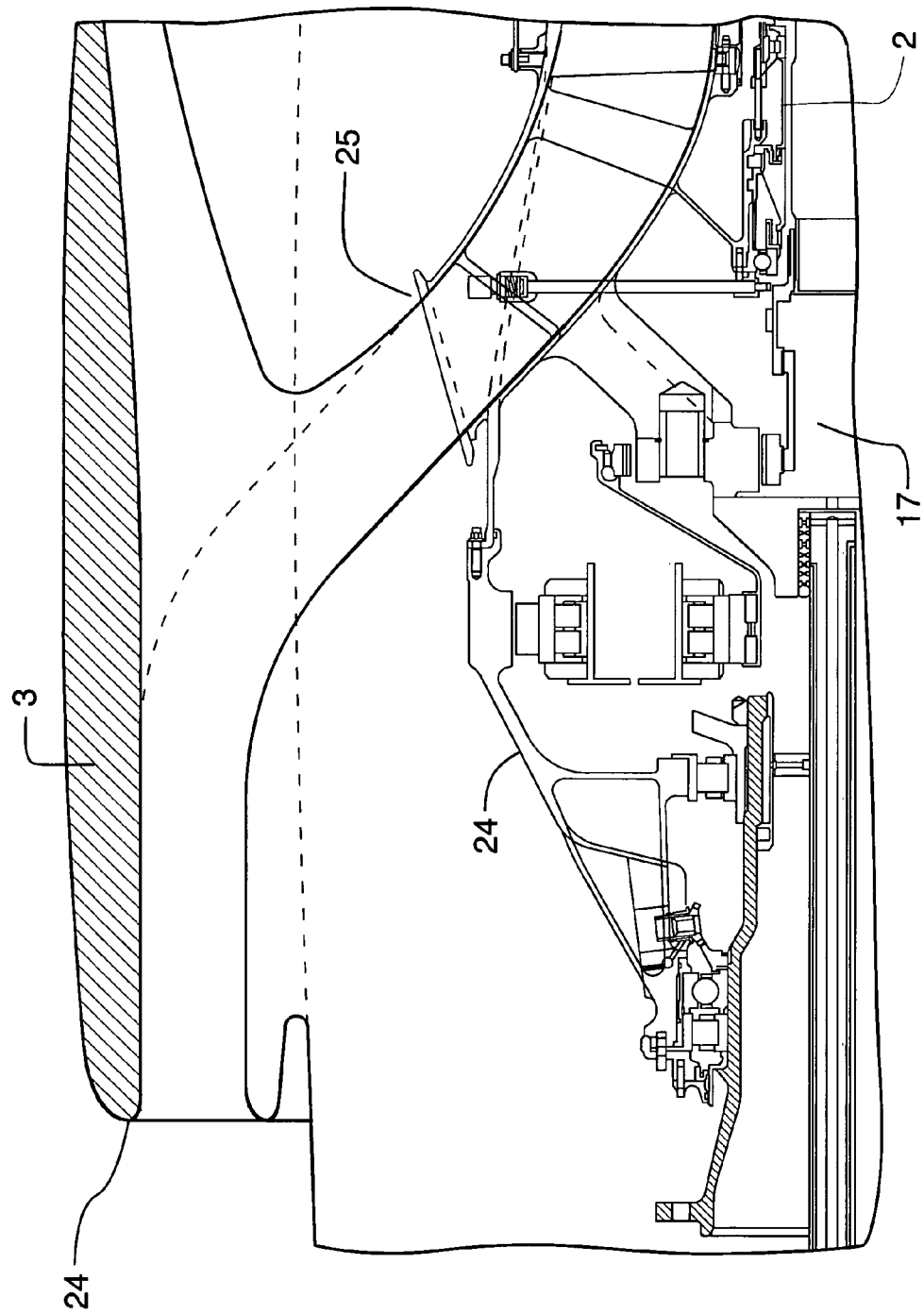
FIG. 4 is an axial cross-sectional view through one half of a bifurcated or dual air inlet duct and associated co-axial forwardly extending reduction gearbox also for a turboprop engine.
Figure 5:
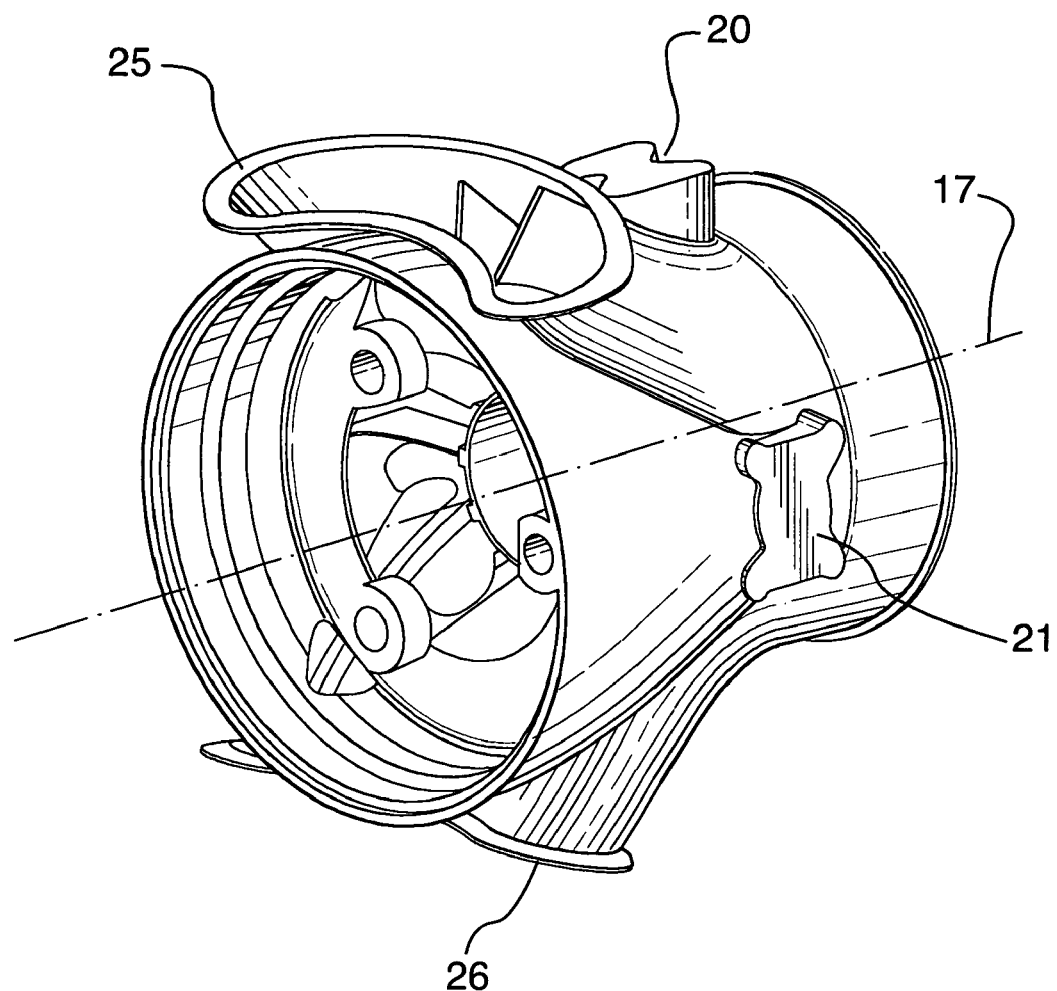
FIG. 5 is a three-dimensional rendering of a bifurcated inlet duct showing top and bottom mirror image ducts, top mounting surface and lateral mounting surface as in FIG. 4.

FIGS. 4 and 5 show a second prior art inlet duct arrangement where the length of the engine is extended less because the inlet duct 3 is bifurcated having an upper engine orifice 24 and a mirror image lower inlet orifice (not shown). FIGS. 4 and 5 show the upper connecting flange 25 whereas FIG. 5 shows the lower connecting flange 26. It will be understood that the top section shown in FIG. 4 is simply reproduced in a mirror image for the bottom portion of the air inlet duct 3 and the forwardly extending reduction gearbox 27 has an input engaging the concentric engine shaft 2.

FIG. 5 shows a disadvantage of this arrangement since the forward top engine mounting surface 20 must be located further back towards the aft of the engine as well as the lateral engine mounting surfaces 21 rather than ideally forward on a surface of the forwardly extending reduction gearbox 27. In effect, the dual top and bottom portions of the inlet duct 3 interfere with the ideal positioning of the top and lateral mounting surfaces 20 and 21. By mounting the engine 1 towards the aft section, the structure must compensate for the increased stress and therefore the prior art bifurcated inlet duct also results in weight and cost penalties.

The advantages of the bifurcated inlet duct however are that the travel path of air inlet does not require the lengthening of the engine to reduce aerodynamic losses.

Figure 6:
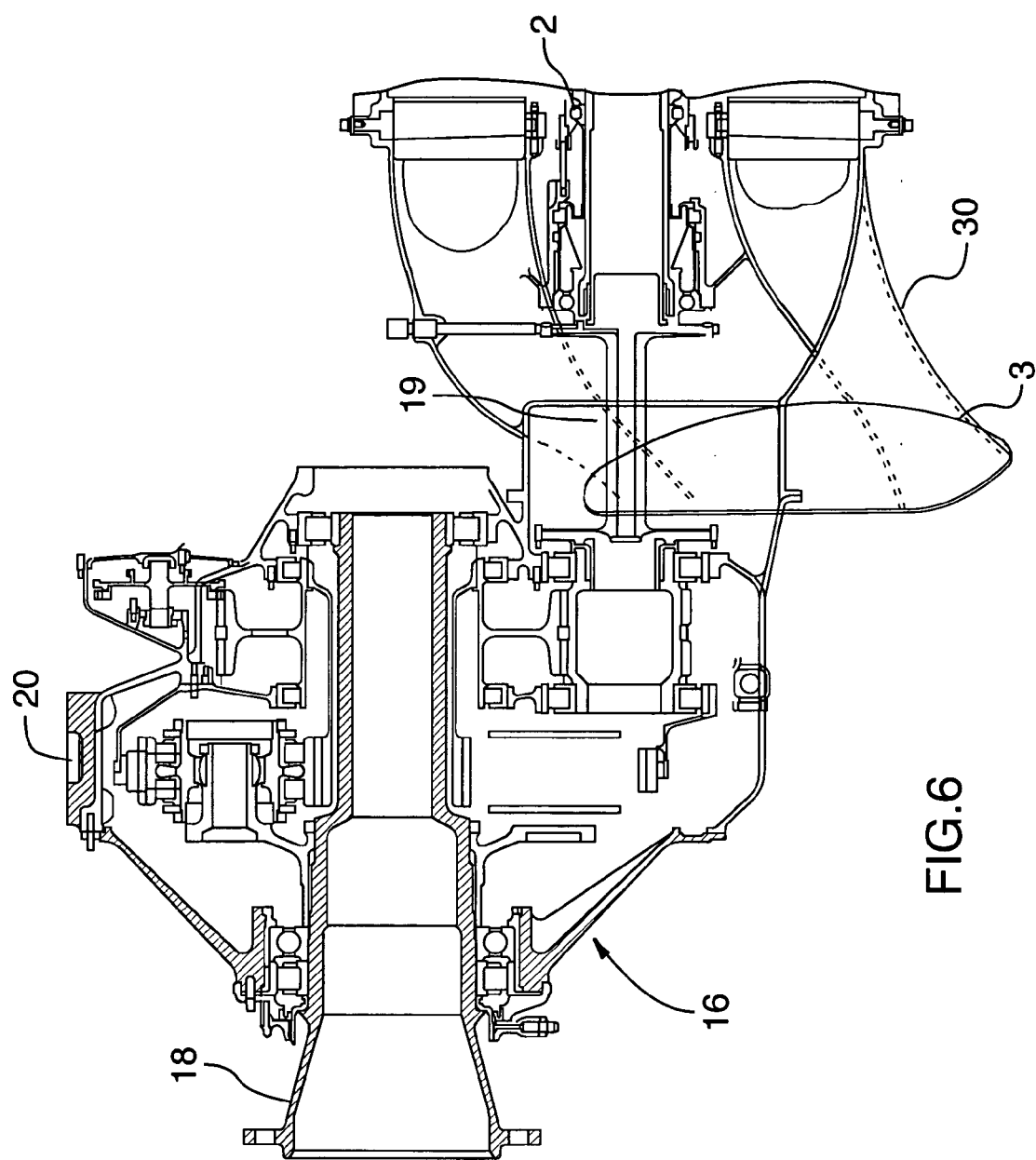
FIG. 6 is an axial cross-sectional view through the hybrid inlet duct according to the invention showing an example of an upwardly offset reduction gearbox having a top engine mounting surface.

FIGS. 6–9 show the hybrid inlet configuration in accordance with the invention which acquires the advantages of both the above described prior art arrangements without suffering the full impact of the disadvantages. Although FIG. 6 shows an upwardly offset reduction gearbox 16 it will be understood that the invention is not restricted to this type of gearbox and can be also applicable to the forwardly extending reduction gearbox as shown in FIG. 4 for example.

Advantageously, the gearbox 16 can be used to mount the engine from the top on the forward top engine mounting surface 20 as indicated in FIGS. 6 and 9. Further, as indicated in FIG. 9, the gearbox 16 can be fitted with a lateral engine mounting surface 21 which connects to the lateral block 23. It will be understood by those skilled in the art that a similar lateral block 23 and lateral mounting surface 21 are provided on the other side of the engine (not shown) and that the engine is installed and removed from the aircraft by raising and lowering into an inverted yoke structure as indicated in FIG. 9.

Further, as best seen in FIG. 6, the shaft 2 includes a forward shaft portion 19 which is relatively short compared with that shown in the prior art of FIG. 2. The engine length is relatively short as a result of the use of dual inlet orifices 28 which intake air into two branches 29 to the main inlet duct 30 that communicate with the compressor 5.

Therefore, the invention provides a novel inlet duct 3 having an aft end 30 that is adapted for gas communication with the inlet of the engine compressor 5 and encircles the engine shaft 2 that passes through the main duct 30.

Figure 7:
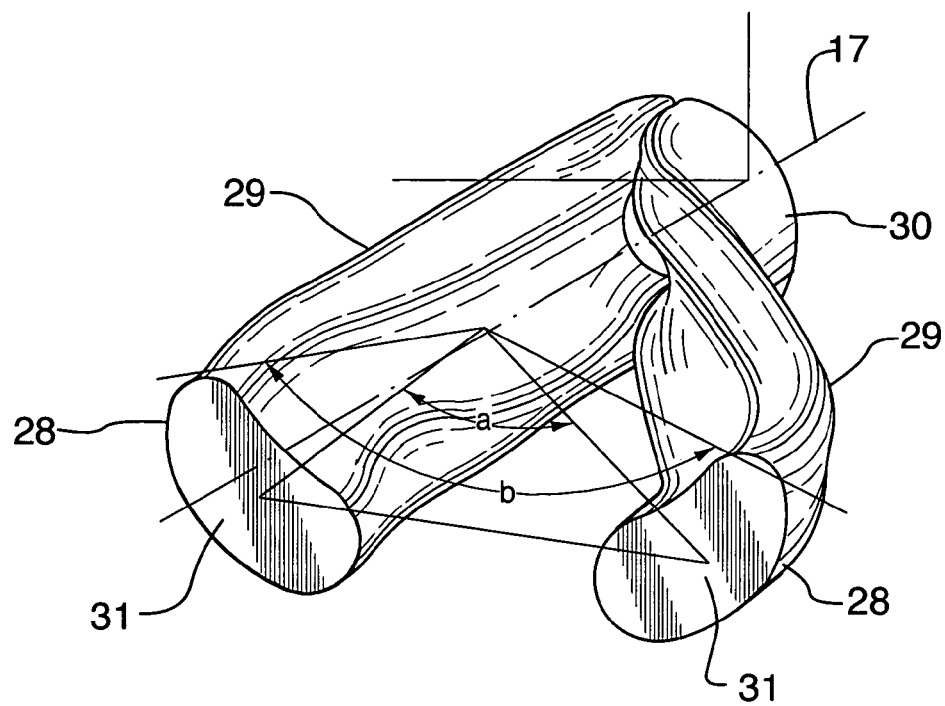
FIG. 7 is a three dimensional orthogonal view of the hybrid inlet with dual inlet orifices showing the geometry of the branches with outer duct walls.

At least two inlet duct branches 29 have a forward end with an inlet orifice 28. As shown in the example embodiment of FIGS. 6 through 9, the inlet orifice 18 can be disposed entirely below the axial shaft axis 17 of the engine. In this location, the branches 29 and inlet orifices 28 are free from interference with the engine support yoke, the top and lateral blocks 22 and 23, as well as being clear of the gearbox 16. Stated otherwise, the outer walls of the branches 29 are disposed within a three dimensional space envelope that is clear of the lateral engine mounting surfaces. FIG. 7 shows the outer duct walls of the branches 29 within a three dimensional space envelope and illustrates the smooth arcuate transition which is achieved between the forward end with two spaced apart inlet orifices 28 to the annular aft end 30 that merges with the annular inlet (not shown) of the compressor (5 in FIG. 1).

Figure 8:
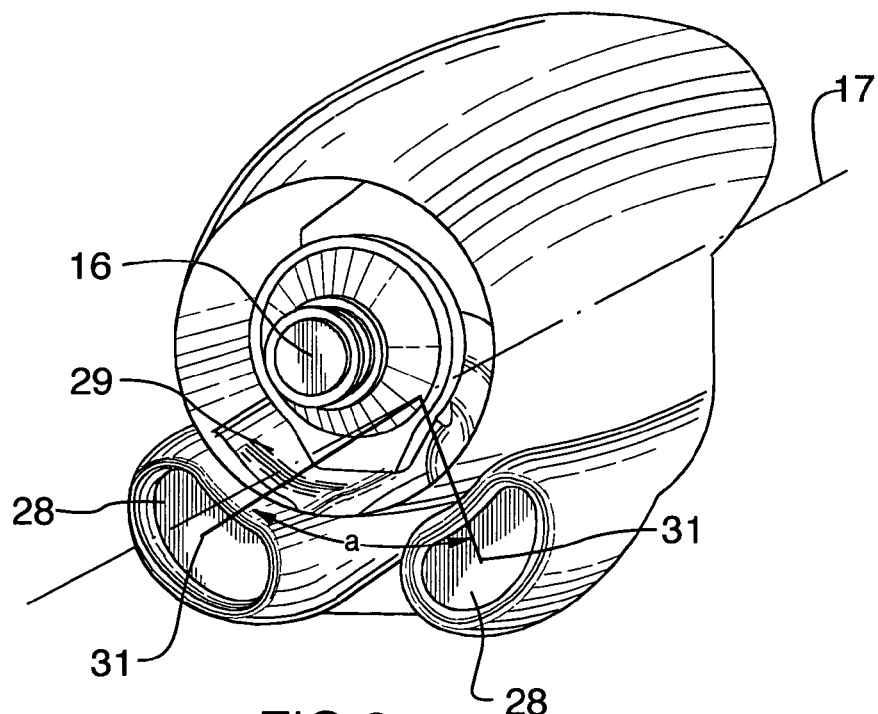
FIG. 8 is a three dimensional rendering of the front portion of the aircraft structure with dual inlet orifices, both of which are disposed below the axial shaft axis of the engine.

With reference to FIGS. 7 and 8, each inlet orifice 28 has a centroid 31 in a radial plane 32 through and transverse to the shaft axis 17. The centroids 31 and the shaft axis 17 define an angle "a" that is less than 180° and can be reduced to an angle "a" of 90° or less depending on the design requirements of the engine 1. Referring to the outer walls of the branches 29 of the inlet duct 3, the space envelope shown in FIG. 7 within which the forward end of the branches 29 are contained, subtends an angle "b" of less than 180° about and transverse to the shaft axis 17.

As best seen in FIG. 9, the engine 1 has a forward top engine mounting surface 20 and two forward lateral engine mounting surfaces 21. In the example shown, the branches 29 are disposed below the lateral engine mounting surfaces 21 in a space envelope that is free from interference from with the engine support yoke and gearbox 16. In the embodiment shown, the lateral engine mounting surfaces 21 are symmetric left and right, as are the left and right branches 29. However, depending on the specific mounting structure, the disposition and orientation of the branches 29 may be oriented accordingly to avoid interference.

Although the above description relates to a specific preferred embodiment as presently contemplated by the inventors, it will be understood that the invention in its broad aspect includes mechanical and functional equivalents of the elements described herein. For example, other gearbox configurations may be provided, and other conduit paths may be provided. Still other changes will be apparent to the skilled reader in light of the teachings of this application.

We claim:

1. A turboprop powerplant comprising:
    at least a compressor having a forward compressor inlet and a shaft extending axially through the compressor and having a shaft axis;
    an inlet duct encircling the shaft passing therethrough, the inlet duct having an aft end in gas communication with the compressor inlet and a forward end having at least two branches each with an inlet orifice, each inlet orifice having a centroid in a radial plane through and transverse to the shaft axis, the centroids and shaft axis defining an angle less than 180°.

2. A turboprop powerplant according to claim 1 wherein the powerplant has at least two forward lateral engine mounting surfaces, and wherein the branches have outer duct walls disposed within a space envelope clear of the lateral engine mounting surfaces.

3. A turboprop powerplant according to claim 2 comprising symmetric left and right outboard forward lateral engine mounting surfaces, and symmetric left and right branches of the inlet duct.

4. A turboprop powerplant according to claim 1 comprising an upwardly offset reduction gearbox having an input engaging the engine shaft.

5. A turboprop powerplant according to claim 4 comprising a forwardly extending reduction gearbox having an input engaging and concentric to the engine shaft.

6. A turboprop powerplant according to claim 4 having a forward top engine mounting surface located on said gearbox.

7. A turboprop powerplant according to claim 5 having a forward top engine mounting surface located on said gearbox.

8. A turboprop powerplant according to claim 4 comprising a propeller driven by an output of said gearbox.

9. A turboprop powerplant according to claim 5 comprising a propeller driven by an output of said gearbox.

10. A turboprop powerplant according to claim 1, wherein the inlet orifices are disposed below the shaft axis of the engine.

11. A turboprop powerplant according to claim 1, wherein the angle is 90° or less.

12. A turboprop powerplant comprising:
    at least a compressor having a forward compressor inlet and a shaft extending axially through the compressor and having a shaft axis;
    an inlet duct encircling the engine shaft passing therethrough, the inlet duct having an aft end in gas communication with the compressor inlet and a forward end having at least two branches each with an inlet orifice, wherein the engine has at least two forward lateral engine mounting surfaces, and wherein forward ends of the branches have outer duct walls disposed within a space envelope clear of the lateral engine mounting surfaces, the space envelope subtending an angle of less than 180° about and transverse to the shaft axis.

* * * * *

UNITED STATES PATENT AND TRADEMARK OFFICE
CERTIFICATE OF CORRECTION

PATENT NO.        : 6,990,798 B2
APPLICATION NO.   : 10/823695
DATED             : January 31, 2006
INVENTOR(S)       : Bouchard et al.

It is certified that error appears in the above-identified patent and that said Letters Patent is hereby corrected as shown below:

On the title page item (73) should read: Pratt & Whitney Canada Corp., Longueuil, Canada Signed and Sealed this
Twenty-ninth Day of May, 2012

David J. Kappos
*Director of the United States Patent and Trademark Office*